Dec. 20, 1960        C. A. KIEFFABER        2,964,890
AUTOMATIC ROLLER DISCHARGE PANNING MECHANISM
Filed March 31, 1955                                5 Sheets-Sheet 1

Fig. 1

INVENTOR.
CLARENCE A. KIEFFABER
BY
*Alfred R. Fuchs*
ATTORNEY

Dec. 20, 1960                     C. A. KIEFFABER                     2,964,890
                AUTOMATIC ROLLER DISCHARGE PANNING MECHANISM
Filed March 31, 1955                                          5 Sheets-Sheet 2

INVENTOR.
CLARENCE A. KIEFFABER
BY
Alfred R. Fuchs
ATTORNEY

Dec. 20, 1960 C. A. KIEFFABER 2,964,890
AUTOMATIC ROLLER DISCHARGE PANNING MECHANISM
Filed March 31, 1955 5 Sheets-Sheet 3

Fig. 4.

INVENTOR.
CLARENCE A. KIEFFABER
BY
Alfred R. Fuchs
ATTORNEY

Dec. 20, 1960        C. A. KIEFFABER        2,964,890
AUTOMATIC ROLLER DISCHARGE PANNING MECHANISM
Filed March 31, 1955        5 Sheets-Sheet 4

INVENTOR.
CLARENCE A. KIEFFABER
BY
Alfred R. Fuchs
ATTORNEY

Dec. 20, 1960 C. A. KIEFFABER 2,964,890
AUTOMATIC ROLLER DISCHARGE PANNING MECHANISM
Filed March 31, 1955 5 Sheets-Sheet 5

INVENTOR.
CLARENCE A. KIEFFABER
BY Alfred R. Fuchs
ATTORNEY

United States Patent Office 2,964,890
Patented Dec. 20, 1960

2,964,890

AUTOMATIC ROLLER DISCHARGE PANNING MECHANISM

Clarence A. Kieffaber, Overland Park, Kans., assignor to Stickelber & Sons, Inc., a corporation of Missouri Filed Mar. 31, 1955, Ser. No. 498,181

17 Claims. (Cl. 53—74)

My invention relates to loaf panning devices, and more particularly to an automatic roller discharge panning mechanism. This is a continuation-in-part of my application Serial No. 471,305, filed November 26, 1954, on Automatic Roller Discharge Panning Mechanism, now abandoned.

It is the principal purpose of my invention to provide a panning mechanism that is particularly adapted for depositing twisted bread loaves into pans automatically. Whether the twisting of the loaf is done by hand or mechanically, as in my Patent No. 2,843,062, patented July 15, 1958, on Bread Molding Machine, some difficulty is encountered in depositing such a twisted loaf into a pan automatically without danger of the loaf becoming partially untwisted, which would cause a misshapen or crippled loaf of bread to be produced. In a panning mechanism it is important that each loaf be deposited in proper position in the pan so that it will not lap over the end edges or side edges thereof or extend up on said edges, but instead will lie in the bottom of the pan. In order to accomplish this purpose it is necessary that the means for depositing the loaves in the pans do this accurately, so that each loaf is deposited in substantially the same position in the pan to which it is assigned.

In panning mechanisms that have been previously used for automatically discharging loaves into pans the handling of the twisted loaves by such panning mechanism has caused some, if not all of the loaves, to be partly untwisted, thus making it impractical to automatically pan said loaves after the same have been twisted. This is due to the fact that the loaf has to slide over certain stationary wall portions in order to be transferred from the loaf conveyor to the pan on the pan conveyor in such panning mechanisms. I have avoided this difficulty by providing a roller panning device in which there is no such sliding movement and the twisted loaf is handled in a gentle enough manner that it will be deposited in twisted condition in the pan.

More specifically my invention comprises loaf supporting means comprising a plurality of rollers that receive the twisted loaves from suitable conveying means, said rollers being so mounted that these are rotatable about parallel axes and the mounting being of such a character that the rollers can be moved from a loaf supporting position to a loaf discharging position by a swinging movement of the mounting.

Said mounting means preferably comprises mounting means for each of a set of rollers that is mounted for pivotal movement about an axis near one end thereof, said mounting means being longitudinally aligned and the pivotal mounting thereof being at the ends thereof that are remote from each other so that the supporting means operates in a similar manner to a pair of trap doors, except that the supporting surface instead of being a flat member or a sheet-like member, is a plurality of rollers, there being a set of rollers mounted on each set of mounting members.

My invention further comprises means that is actuated by the loaf, that is deposited on and carried by the roller conveying means along the loaf supporting means, to actuate said loaf supporting means to permit the same to drop to a loaf discharging position, and to provide means for returning said loaf supporting means, after the loaf has been discharged into the pan, to loaf supporting position, which is actuated by means associated with the mounting means so as to be operated when the mounting means has moved the supporting means to discharging position.

It is another purpose of my invention to provide means controlling the position of pans relative to the loaf supporting and discharging means comprising a pan conveyor and a pan stop that is movable into and out of pan engaging position, the position of which is controlled by movement of the roller mounting means.

It is a further purpose of my invention to provide a loaf panning device that comprises supporting means that is made up of a plurality of rollers mounted for rotation about parallel axes, with means for rotating certain or all of said rollers in the same direction to thus advance the loaf toward the means that controls the operation of the apparatus to discharge the loaves into the pans.

It is a further important purpose of my invention to provide a roller discharge mechanism, of the above referred to character, in which the rollers are provided with a surface covering non-adhesive with respect to dough, said surface covering being uninterrupted around the surface of the rollers to thus avoid the exposure of any metal to the dough on the dough contacting surface of the rollers. More particularly each of said rollers is preferably provided with a tubular outer layer or ply of a synthetic resin having a negligible adhesive factor with respect to dough, and specifically my invention relates to such rollers having an inner metallic body portion and an outer cylindrical surface covering of either polytetrafluoroethylene or polyethylene.

It is still a further purpose of my invention to provide a roller discharge mechanism with such synthetic resin covered rollers that have a roughened outer surface for gripping the dough to convey the molded loaves forwardly without slippage.

It is another purpose of my invention to provide a roller that is adapted to engage with the twisted loaf, with sufficient pressure to assure the adherence of the twisted loaf portions to each other, cooperating with the conveying means, in the form of a conveyor belt that feeds the loaves to the loaf supporting panning means, which is closely adjacent the discharge end of said conveyor and thus closely adjacent the rollers of the panning device.

Other objects and advantages of my invention will appear as the description of the drawings proceeds. I desire to have it understood, however, that I do not intend to limit myself to the particular details shown or described except as defined in the claims.

Figure 1:
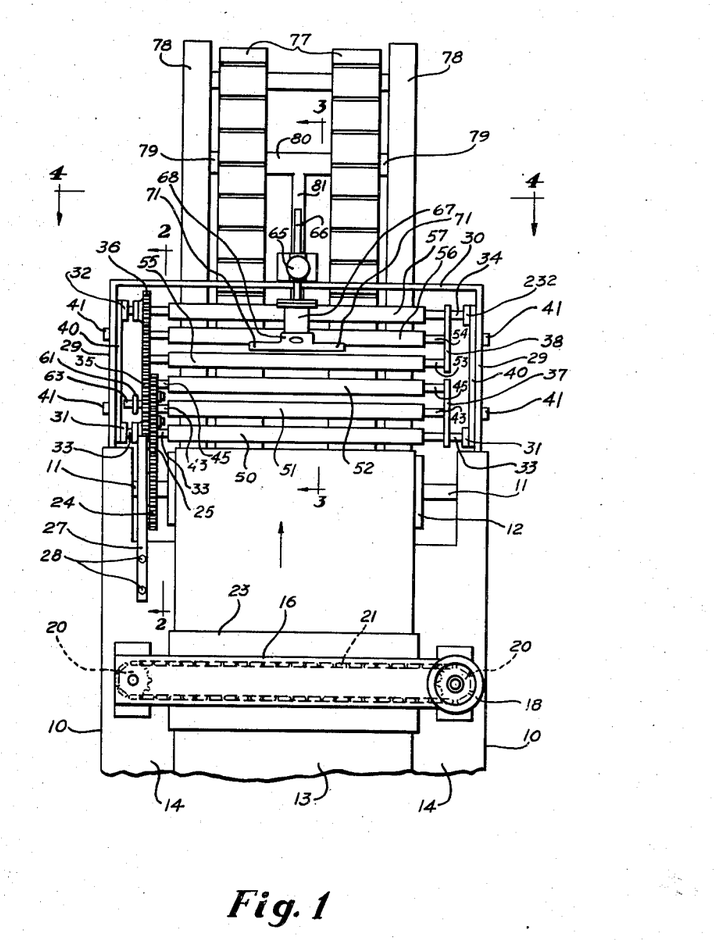
Fig. 1 is a plan view of my improved automatic roller discharge panning mechanism, a portion of a bread molding machine to which the same is applied being also shown in plan therein.

Referring in detail to the drawings, in Fig. 1 is shown the discharge end portion of a bread molding machine having a frame 10 on which is mounted in suitable bearings a roller shaft 11 having the conveyor roller 12 mounted thereon to rotate therewith. A conveyor belt 13 operates over the roller 12, which rotates in the direction indicated by the arrows in Figs. 2 and 3, the upper run of the conveyor traveling in the direction indicated by the arrow thereon in Fig. 1. Said frame has a table portion 14 over which the upper run of the belt 13 operates, and suitable standards 15 extend upwardly from the frame 10 and are connected at their upper ends by a suitable cross member 16. Bearing blocks 17 are mounted slidably in the standards 15 and are adjustable vertically in the standards by means of a hand wheel 18 mounted on a shaft 19 with which one of said bearing blocks 17 is screw-threadedly connected, a suitable driving connection, such as the pair of sprocket wheels 20 and the sprocket chain 21, being provided for simultaneously adjusting both of the bearing blocks 17 by means of the hand wheel 18.

Mounted in the bearing blocks are the ends of the shaft 22 on which a roller 23 is mounted. It will be obvious that the roller 23 can be adjusted vertically relative to the table 14 and relative to the conveyor belt 13 by rotation of the hand wheel 18 in a desired direction. The belt 13 can receive twisted bread loaves from a suitable twisting mechanism such as that shown in my Patent No. 2,843,062, above referred to, or bread loaves that are made up of a plurality of loaf portions that have been formed by means of sheeted dough pieces coiled up on themselves and such loaf portions then twisted by hand while on the belt 13. No matter in what manner the twisting is accomplished, the roller 23 is so adjusted relative to the belt 13 that it will exert a flattening pressure on the twisted loaf sufficient to firmly adhere the twisted loaf portions together. The twisted loaf thus formed is carried to the end of the conveyor belt 13 shown at the right in Fig. 1, and from this belt delivered to the panning mechanism.

The conveyor belt 13 is driven in any suitable manner from the opposite end thereof from that having the roller 12 thereon. However, the roller 12 is mounted on the shaft 11 so as to rotate therewith and thus the rotation of the roller 12 by means of the belt 13 positively drives the shaft 11. Fixed on the shaft 11 to rotate therewith is a spur gear 24, which meshes with a much smaller spur gear 25, which is mounted to rotate with a shaft 26 that is mounted in a suitable bearing in a bar-like bracket member 27, which is fixed in any suitable manner on the frame 10, as by means of fastening elements 28.

Figures 2, 3, 10:
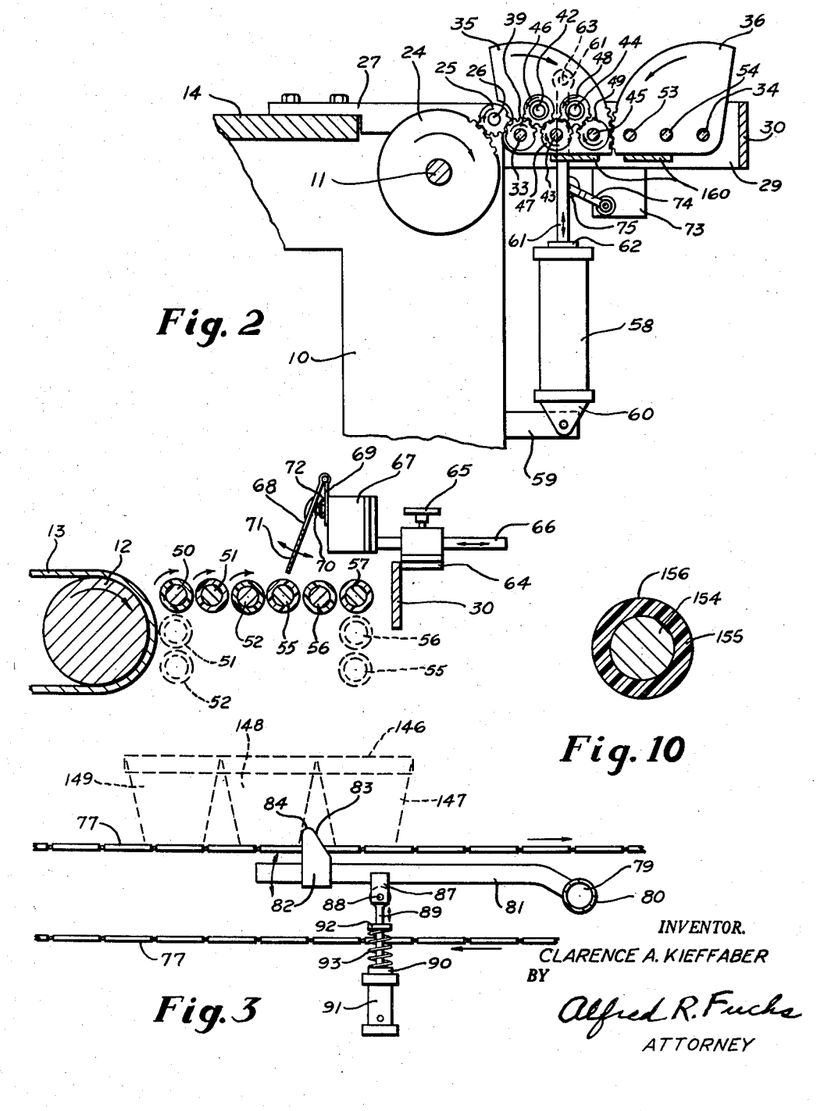
Fig. 2 is a fragmentary sectional view taken on the line 2—2 of Fig. 1 on a slightly enlarged scale.
Fig. 3 is a similar section taken on the line 3—3 of Fig. 1, the gearing and mounting therefor being omitted.
Fig. 10 is a transverse sectional view through one of the panning mechanism rollers, on an enlarged scale.

A frame having the side members 29 and the cross member 30 is also fixed in any suitable manner on the frame 10. Said side members 29 are provided with suitable bearings 31 and 32 for the shafts 33 and 34. Mounted to swing about the axis of the shaft 33 at one side of the frame is a sector gear member 35, and mounted on the shaft 34 at the same side of the frame is a sector gear member 36, said sector gears 35 and 36 intermeshing as shown in Fig. 2. Near the other side of the frame a pair of bar-like bracket members 37 and 38 is mounted on the shafts 33 and 34, respectively. The sector gears 35 and 36 and the bracket members 37 and 38 are mounted on the shafts 33 and 34 so as to rotate thereon. A spur gear 39 is also mounted on the shaft 33 to rotate therewith and meshes with the gear 25 and is thus driven by the roller 12 in the same direction as said roller 12. The bearings 31 and 32 are mounted on brackets 40 which are secured to the side members 29 by suitable fastening elements 41.

The sector gear member 35 also serves as a mounting plate for a plurality of shafts 42, 43, 44 and 45 having, respectively, the spur gears 46, 47, 48 and 49 thereon. The shafts 43 and 45 as well as the shaft 33, extend between the sector gear 35 and the bracket 37 and are mounted for rotation in the members 35 and 37. The shaft 33 has a roller 50 provided thereon that rotates with said shaft, and the shafts 43 and 45 have the rollers 51 and 52 provided thereon and rotating therewith. Because of the interposition of the gears 39 and 48 said rollers all rotate in the same direction or in a direction such that any object deposited thereon will travel in the same direction as the upper run of the conveyor belt 13, or toward the right as viewed in Fig. 1. The sector member 36 also serves as mounting means for a plurality of shafts 53 and 54, which are mounted for rotation in said sector member 36 as is the shaft 34. Said shafts 53, 54 and 34 are also mounted rotatably in the bracket member 38. The shafts 53, 54 and 34 have the rollers 55, 56 and 57 provided, respectively, thereon and rotating therewith. The rollers 50, 51, 52, 55, 56 and 57 are all made in the same manner as will be described below.

It will be noted that the group of rollers 50, 51 and 52 are adapted to be swung about the axis of the roller 50 in a similar manner to a trap door or gate, and the rollers 55, 56 and 57 are similarly adapted to be swung about the axis of the roller 57. Due to the intermeshing sector gears 35 and 36 it will be obvious that said roller mountings and the rollers carried thereby will be swung about said axes in opposite directions upon movement of said sector gears, that is, when one of said set of rollers is swung about its axis in a clockwise direction the other set of rollers will be swung about its axis in a counterclockwise direction, and vice versa.

Suitable means for swinging said sector gears 35 and 36 about the axes of shafts 33 and 34 is provided. Said means comprises an air cylinder 58, which is pivotally mounted on a bracket 59 by means of a pair of pivot ears 60, as will be obvious from Fig. 4. A piston rod 61 extends upwardly from the cylinder 58, being slidably mounted in a suitable packing gland 62 in the upper end thereof, and is pivotally connected with the sector gear 35 by means of the pivot pin 63. As the piston within the cylinder 58 is moved downwardly from its upper position, which is that in which the parts are shown in Fig. 2, the sector gear 35 will be swung in a clockwise direction as viewed in Fig. 2, the pivotal mounting of the cylinder 58 making provision for the movement of the piston rod 61 out of the position shown in Fig. 2 into an inclined position as said sector 35 swings about the axis of the shaft 33. The stroke of the piston is such that the sector gear 35 will turn through substantially one quadrant and thus the rollers 51 and 52 will be swung about the axis of the roller 50 into a position approaching vertical alignment therewith below the same. At the same time the rollers 55 and 56 will assume a similar position relative to the roller 57. With the rollers in the position shown in full lines in Fig. 3, the rollers 50, 51, 52, 55, 56 and 57 will constitute a substantially horizontal supporting means for articles discharged from the conveyor belt 13, such as the twisted loaf of bread, the uppermost portions of said rollers being slightly below the top surface of the belt 13. As the rollers 50, 51 and 52 are constantly driven in the direction indicated by the arrows in Fig. 3, as soon as a loaf reaches the roller 50 it will be carried successively by the rollers 50, 51 and 52 to the right and onto the roller 55, and from said roller 55 onto the rollers 56 and 57, if necessary, as will be explained below. However, when the piston in the cylinder 58 is moved downwardly from its uppermost position the rollers 51 and 52 and the rollers 55 and 56 will swing about the axes of the rollers 50 and 57 to the dotted line position in Fig. 3 and discharge or dump the loaf resting on a plurality of said rollers downwardly.

Mounted on the cross member 30 of the frame is a bracket 64, which is provided with a suitable clamping screw 65 for clamping a bar 66 in adjusted position in said bracket and thus relative to the transverse wall 30. Mounted on said bar 66 is a limit switch 67, which is of such a character that the circuit through the same is closed upon movement of a pivotally mounted vane 68 a predetermined distance to the right as viewed in Fig. 3. Said vane 68 is pivotally mounted on a bracket 69 on said switch and has a spring 70 provided in a suitable position for holding said vane 68 in its outermost position. Said vane 68, it will be noted, is substantially T-shaped in character having laterally extending arms 71 thereon to thus provide a movable stop member with which a loaf is adapted to engage to move said vane to circuit closing position. Suitable means, such as an adjusting nut 72, may be provided for adjusting the tension on the spring 70. Said switch operating means is preferably so adjusted that a very small amount of movement of the vane 68 is necessary to operate the switch 67. Accordingly as soon as a molded twisted loaf or other molded loaf of bread, or other similar object, engages the vane 68 it will close the circuit through the switch 67 to move the supporting means comprising the rollers 50, 51, 52, 55, 56 and 57 from a supporting position to a discharging or dumping position in a manner to be described below.

A switch 73 is mounted on the side member 29 of the frame adjacent which the sector gears 35 and 36 are mounted, said switch having a pivotally mounted arm 74 thereon provided with a roller 75 for moving said switch to one of its alternative positions, the arm 74 being biased to normally hold the switch in the other alternative position, which is the position in which the roller 75 is in its uppermost position or that shown in Fig. 2. The laterally projecting pivot pin 63 projects from the sector member 35 in such a position as to engage with the roller 75 when the sector member 35 has reached the limit of its movement in a clockwise direction from the position shown in Fig. 2.

Pan conveying means made up of a pair of transversely spaced conveyors each made up of pivotally conected plate-like members 77 is mounted on the longitudinally extending frame members 78, the upper run of said conveyors traveling in the direction indicated by the arrow in Fig. 3. Mounted for swinging movement about a transverse shaft 79 extending crosswise of the frame between the members 78 is a shaft having a sleeve 80 mounted thereon providing for swinging movement of the arm 81 about the axis of the shaft 79. Mounted on said arm 81 is a pan stop member 82, which has a beveled face 83 and a rounded upper end or nose 84 thereon. The body portion of the member 82 is split at 85, as will be obvious from Fig. 4, and is provided with a clamping screw 86. It will be obvious that by releasing the screw 86 the pan stop 82 can be adjusted on the arm 81 and can be clamped in adjusted position on said arm by means of the screw 86.

A pair of ears 87 depend from the member 81, being rigidly secured thereto and having a pivot pin 88 extending therethrough for pivotally connecting a piston rod 89 therewith. Said piston rod 89 extends through a suitable packing gland 90 into an air cylinder 91 and has a collar 92 provided thereon, between which and the cylinder 91 a compression coil spring 93 is mounted, said spring normally holding the pan stop in the raised position shown in Fig. 3. The air cylinder 91 is mounted on a bracket 92 extending from an L-shaped bracket 93 that is mounted on one of the frame members 78. When air under pressure is supplied to the cylinder 91 through the conduit 94 the piston in the cylinder 91 is moved downwardly, said cylinder 91 having an opening to the outer air at the lower end thereof, thus pulling the pan stop 82 downwardly. The stroke of the piston 91 is made very short and the movement of the stop 82 downwardly is accomplished very quickly, and immediately after such downward movement the spring 93 restores the parts to the position shown in Fig. 3.

The supply of air to the cylinder 58 is controlled by means of a valve 95 from which the flexible conduits 96 and 97 extend to opposite ends of the cylinder 58 so that the conduits communicate with the space on opposite sides of the piston in said cylinder. A conduit 98 is provided for supplying air under pressure to said valve 95 and to a similar valve 99 through the branch conduits 100 and 101. The valve 99 only has the conduit 94 extending between the same and the cylinder 91. One of said valves 95 is shown diagrammatically in Fig. 6. The valve 99 is exactly the same in construction as the valve 95, but is only provided with the one conduit 94 extending therefrom instead of the two conduits 96 and 97 shown in Fig. 6. Said valve has a casing 102 in which a plurality of partitioning members 103, 104 and 105 are provided, which are each provided with inner and outer annular grooves 106 and 107 connected by transverse passages 108, all of said partitioning members being of a similar character, the passages in said members 103, 104 and 105 connecting, respectively, with the conduits 96, 100 and 97. A slidable tubular member 109 is provided in the valve, which has a partition 110 therein to divide it into two chambers and which has a head or flange 111 thereon with which a compression coil spring 112 engages, and said tubular member is engaged endwise with a core 113 of a solenoid 114. The core 113 is drawn downwardly into the solenoid 114 mounted in the casing 115 when said solenoid is energized. Passages 116 and 117 are provided leading to the outer air.

Figure 6:
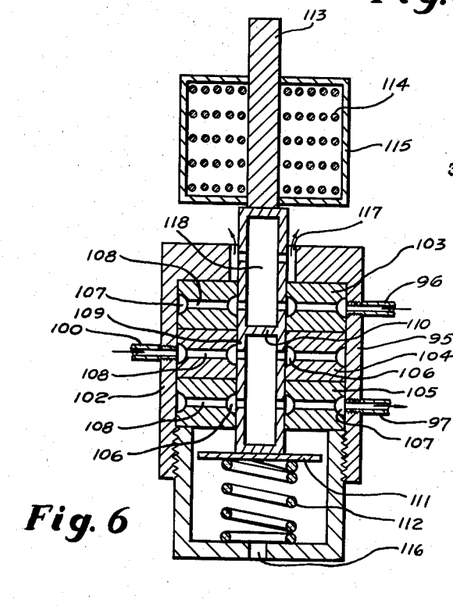
Fig. 6 is a diagrammatical vertical sectional view of an air valve mechanism such as may be used in conjunction with my apparatus.

It will be obvious that when the valve shown in Fig. 6 is in the position shown therein, which is that in which the solenoid is not energized, the conduit 96 will be connected with the outer air through chamber 118 in the tubular member 109 and passage 117 while the conduit 97 will be connected with the conduit 100 through the chamber 119 in the tubular member 109 supplying air under pressure to the piston in the cylinder 58 to maintain the rod 61 in its extended position, in which the rollers are in the full line position shown in Fig. 3.

When the solenoid 114 is energized the core 113 thereof moves downwardly from the position shown in Fig. 6, moving the tubular member 109 downwardly into its alternative position in which the conduit 96 is connected with the conduit 100 through the chamber 118 in the member 109 to supply air under pressure to the conduit 96, and at the same time opening the conduit 97 to the outer air through the chamber 119 and passage 116. This causes air under pressure to be supplied to the cylinder 58 on the upper side of the piston therein, moving it downwardly, and through the rod 61 rotating the sector gears 35 and 36 clockwise and counterclockwise, respectively, the stroke of the piston being such that the rollers are moved from the full line position shown in Fig. 3 to the dotted line position shown therein.

Figure 5:
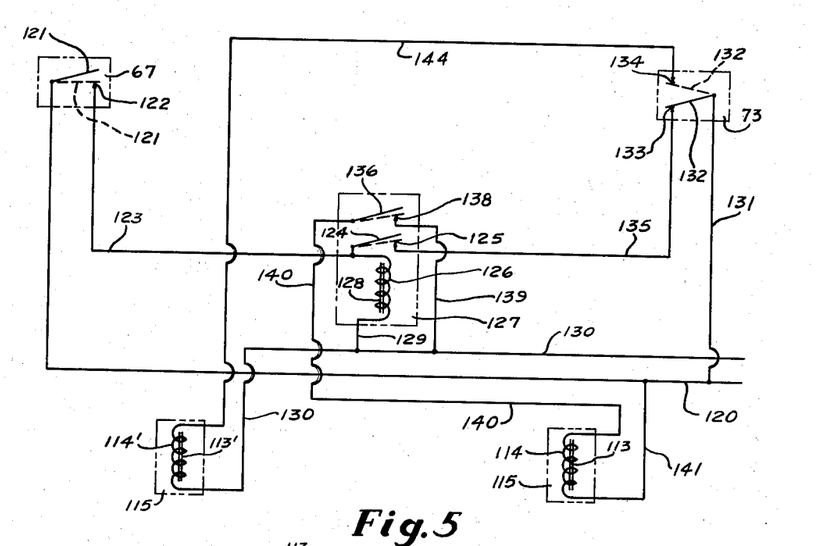
Fig. 5 is a diagrammatic view of the operating circuit for my improved panning mechanism.

The operating circuit for my improved panning device is shown in Fig. 5, in which the line wire 120 is connected with a movable switching element 121 of the switch 67, which is adapted to engage a contact 122, from which the conductor 123 extends to a movable switching element 124, which is adapted to engage a stationary contact 125. Said conductor 123 also leads to a winding 126 of the relay 127, which has the armature 128 that is adapted to move the switching element 124 from the full to the dotted line position shown in Fig. 5. A conductor 129 leads from the other end of the winding 126 to the line conductor 130. It will be noted that when the switch 121 is moved from the full to the dotted line position shown in Fig. 5 the winding 126 is energized and the switching element 124 engages the stationary contact 125.

A conductor 131 also extends from the line wire 120 to the movable switching element 132 of the switch 73, which is adapted to engage the stationary contacts 133 and 134. The normal position of the switching element 132 is that shown in full lines in Fig. 5, and it will be noted that when said switching element 132 is in said position the winding 126 will be connected in the circuit between the line wires 120 and 130 upon engagement of the movable contact 124 with the stationary contact 125, a conductor 135 connecting the stationary contacts 125 and 133, the circuit then being from the conductor 120 through the conductor 131, switching element 132, conductor 135, switching element 124, winding 126 and conductor 129 to the conductor 130. Accordingly, after the switching element 121 has been engaged with the stationary contact 122, which occurs when a molded loaf has moved the switching element 67 to circuit closing position by movement of the vane 68 the circuit through the winding 126 will be maintained so as to keep the switching elements of the relay in their dotted line position as long as the switching element 132 is in engagement with the contact 133.

The armature 128 of the relay also controls the movement of the switching element 136, moving it along with the switching element 124 from the full to the dotted line position shown in Fig. 5. Accordingly when the winding 126 is energized in the switching element 136 engages the stationary contact 138, which is connected with the line wire 130 through the conductor 139. Said switching element is connected also with the conductor 140 that extends to one end of the solenoid winding 114, the other end of said solenoid winding being connected with the line wire 120 by the conductor 141. Thus the solenoid 114 will be energized upon closing of the switching element 121 of the switch 67 and will remain energized as long as the relay is maintained in the position resulting from energization of the winding 126 thereof and thus the valve 95 will be supplied with air under pressure through the conductor 96 during this time.

When the switch 73 is opened by engagement of the projecting pin 63 on the gear 35 with the roller 75 and movement of the switch operating member 74 through a predetermined angle the switching element 132 of the switch 73 is moved to the dotted line position, breaking the circuit between the conductors 131 and 135, and inasmuch as the molded loaf has left its position in engagement with the vane 68, the switching element 121 has also moved from the dotted line position thereof back to the full line position thereof. Thus the winding 126 is de-energized and the relay returns to its normal position with the switching elements in their full line position. The circuit between the conductors 139 and 140 is also broken due to the de-energization of the winding 126, thus de-energizing the solenoid 114, whereupon the valve 95 is moved into the position shown in Fig. 6 by means of the spring 112. When this occurs the air under pressure is supplied to the conduit 97 and the conduit 96 is open to the atmosphere, causing the piston in the cylinder 58 to move upwardly and the rollers to be moved back to the full line position shown in Fig. 3.

The conductor 144 extends from the stationary contact 134 to one end of the solenoid winding 114' which, when energized, moves the core 113' into a position to move the switch 99 to a position to connect the conduit 94 with the air under pressure conduit 101. The other end of the solenoid winding 114' is connected with the line wire 130, and thus when the switch 132 is in engagement with the stationary contact 134 a circuit will be completed from the line wire 120 through the conductor 131, switching element 132, conductor 144 and winding 114' to the line conductor 130, energizing the solenoid 114' and operating the valve as above stated. Due to the slight amount of lag in the movement of the parts, the energization of the solenoid 114' will not take place until after the piston in the cylinder 58 has begun its return or upward movement.

A pan 146, which is shown as having a plurality of loaf receiving portions 147, 148 and 149, which are connected together by a strap in the usual manner, is shown as being mounted on the conveyor members 77 bridging the space between said conveyor members with the stop member 82 in engagement with the loaf receiving portion 148 to hold it against movement so that it will not travel with the conveyor members until released by movement of the stop 82 from said pan section or loaf receiving portion 148. When the solenoid 114' is energized and air under pressure is supplied to the cylinder 91 the piston therein, which has a very short stroke, is moved downwardly to pull the pan stop 82 downwardly against the action of the spring 93.

However, as the projection 63 is only in engagement with the roller 75 for a short portion of the movement of the sector gear 35, the supply of air under pressure to the cylinder 91 is for a very brief interval, and as soon as the supply of air ceases the piston in the cylinder 91 is returned to its uppermost position due to the action of the spring 93, returning the pan stop 82 to its holding position. If the conveyor has not moved the pan far enough for the pan stop to have left the bottom of the loaf receiving portion 148, the pan stop will remain in depressed position until the space between the loaf receiving portions 148 and 149 is reached, whereupon the pan stop will, under action of the spring 93, move into position into engagement with the loaf receiving portion 149 to hold the loaf receiving portion 149 in a position corresponding to that shown for the loaf receiving portion 148 in Fig. 3 ready to receive the next loaf that is to be panned.

In use of the valve 99 the opening thereof corresponding to the opening of the valve 95 connected with the conduit 97 is plugged shut and the conduit 94 is connected in the same manner to the valve 99 as the conduit 96 is connected with the valve 95. Accordingly with the valve in its upper position, which is the position in which the piston in the cylinder 91 is in its uppermost position the parts will be in the position shown in Fig. 6, but when the solenoid 114' is energized to move the armature 113' downwardly the connection is completed between the conduit 101 and the conduit 94. However, as soon as the winding of the solenoid is de-energized the parts return to the position shown in Fig. 6, thus opening the space above the piston in the cylinder 91 to the atmosphere, permitting return thereof under the action of the spring 93 to its uppermost position.

Figure 4:
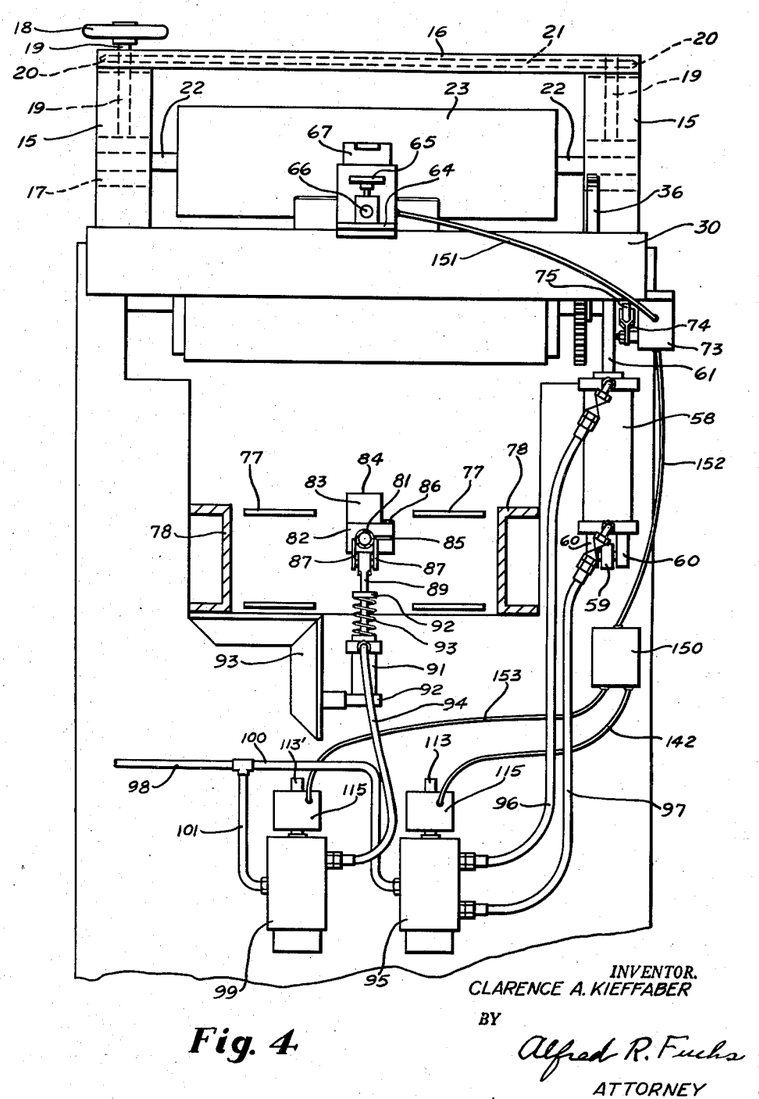
Fig. 4 is a vertical sectional view on an enlarged scale taken on the line 4—4 of Fig. 1, partly broken away.

In Fig. 4 the conductors referred to in the circuit diagram are enclosed in suitable electrical conduits, the conduit 142 extending between the relay 150 and the solenoid 114, the conduit 151 extending between the switch 67 and the switch 73, the conduit 152 extending between the relay 150 and the switch 73 and the conduit 153 extending between the relay 150 and solenoid 114'. Bracing members 160 are provided extending transversely between the sector gears 35 and 36 and the bracket members 37 and 38 to rigidly connect said gears with said bracket members.

Figure 11:
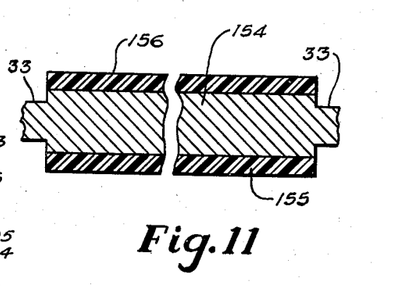
Fig. 11 is a longitudinal sectional view of said roller, partly broken away.

Each of the rollers 50, 51, 52, 55, 56 and 57 is preferably made as illustrated in Figs. 10 and 11, the roller 50 being illustrated in said figures, but all of said rollers being duplicates in structure. The roller 50 has a metallic core 154 constituting a cylindrical enlargement integral with the shaft 33 that has a tubular cover ply 155 mounted thereon and co-extensive therewith. Said cover ply is mounted on the core 154 to rotate therewith, as by being pressed on said core, and has a roughened outer cylindrical surface 156, the roughening being preferably obtained by means of knurling. The cover ply 155 is preferably made of polytetrafluoroethylene or polyethylene and said ply is applied to the core 154 by pressing a tube of polytetrafluoroethylene or polyethylene thereon. By providing the polytetrafluoroethylene or polyethylene outer ply 155 on the rollers the molded loaf will not stick thereto, as dough, even though sticky, will not stick to the ply 155, thus preventing any untwisting of the twisted loaf or interference with the panning of the loaf due to adherence to the rollers.

In operation the twisted loaf of bread, which is carried along by the conveyor belt 13 toward the roller loaf supporting means comprising the rollers 50, 51, 52, 55, 56 and 57 passes from the discharge end of the belt 13 onto the roller 50 and is carried by the rotation of the rollers 50, 51 and 52 toward the right in Fig. 3 until it engages sufficiently with the vane 68 to close the switch 67. The point at which this occurs in the travel of the molded loaf depends upon the adjustment of the bar 66 relative to the transverse wall 30. Adjustment of the position of the vane 68 is such that the loaf will be discharged properly from the roller supporting means into the loaf receiving portion of the pan that is in position in engagement with the stop 82. Obviously a very close adjustment of the position of both the loaf receiving portion and the vane can be obtained by the adjusting means provided for the member 82 on the arm 81 and the bar 66 in the bracket 64. When the switch 68 is closed the circuit connections are made as above to cause the piston in the cylinder 58 to move downwardly, moving the sector members 35 and 36 in the direction of the arrows indicated thereon in Fig. 2 to an extent such that the rollers 51 and 52 and rollers 55 and 56 are swung about the axes of the rollers 50 and 57 into a position that said rollers 51 and 52 and 55 and 56 are, respectively, substantially vertically below the rollers 50 and 57 as shown in dotted lines in Fig. 3.

Upon the parts reaching the position with said rollers 51 and 52 substantially vertically below the roller 50 and the rollers 55 and 56 substantially vertically below the roller 57 the switch 73 is actuated to de-energize the solenoid 113 and energize the solenoid 113', the lag in the movement of the parts permitting the beginning of the upward movement of the rollers 51, 52, 55 and 56 before the stop member 82 is moved quickly downwardly by supply of air under pressure to the cylinder 91 upon energization of the solenoid 113', the quick return of the stop member 82 to its holding position being effected in the manner above pointed out upon further upward movement of the rollers 51, 52, 55 and 56.

Said rollers are returned to their horizontally aligned loaf supporting position rapidly as the movements of the piston in the cylinder 58 are accomplished quickly due to the supply of compressed air to one side of the piston and the opening of the chamber on the other side of the piston to the atmosphere. The parts are then ready for receiving the next loaf for panning purposes, the pan having moved in the meantime sufficiently to present the next loaf receiving portion in a position for receiving the next loaf to be panned. It is, of course, to be understood that a supply of pans is in position on the conveyor members 77 so that when one pan 146 has had its loaf receiving portions filled the next pan will be in position to have its first loaf receiving portion stopped by the member 82 in a position to receive the next loaf to be panned, such a loaf receiving portion always reaching the position for receiving a loaf before a loaf has traveled across the driven rollers into engagement with the switch actuating member 68 to close the switch 67 to start the cycle of operations above described.

Figure 7:
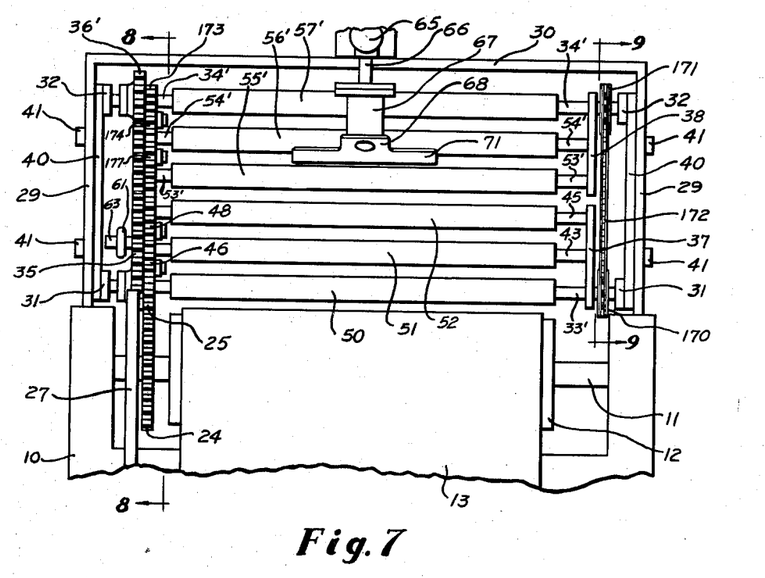
Fig. 7 is a fragmentary plan view of a modification.
Figure 8:
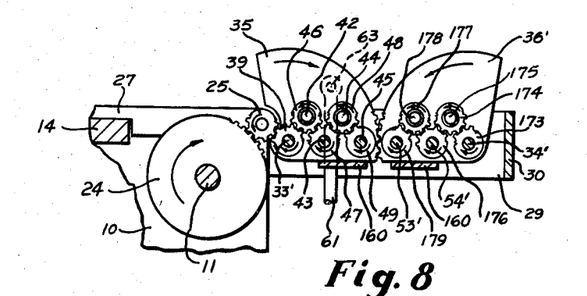
Fig. 8 is a fragmentary section on a slightly enlarged scale taken on the line 8—8 of Fig. 7.
Figure 9:
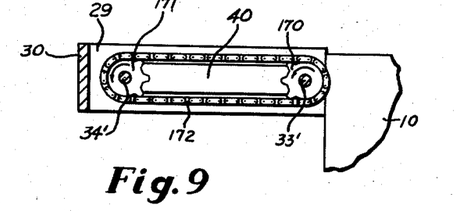
Fig. 9 is a similar view taken on the line 9—9 of Fig. 7.

Instead of providing means for driving only the rollers 50, 51 and 52 all in the same direction as in the above described form of the invention, all of the rollers of the panning device may be driven to rotate in the same direction as illustrated in the form of the invention shown in Figs. 7, 8 and 9. The frame of the broad molding machine, the belt conveyor supplying the molded loaves to the rollers and the means for driving the rollers 50, 51 and 52, as well as the mounting means for the rollers including the frame having the side members 29 and the end member 30 and the brackets 40 carrying the bearings for the roller shafts are the same as described in the form of the invention illustrated in Figs. 1 to 6, inclusive, and the same reference numerals are applied to the corresponding parts in Figs. 1 to 6, and 7 to 9 inclusive. The sector gears are mounted in the same manner as previously described. The actuating means for moving the rollers between the two alternative positions thereof to accomplish the panning is the same as previously described, only the connection between the operating means comprising the piston rod 61 and the pin 63 and the vane 68 for operating the switch 67 and its mounting being illustrated in Figs. 7 to 9 inclusive, as this structure is the same in both forms of the invention.

The shaft 33' is in the same position as the shaft 33, and has the roller 50 provided thereon, which is a duplicate of the roller 50 on the shaft 33, but instead of merely being mounted in a bearing 31 at the right hand end thereof as shown in Fig. 7, a sprocket 170 is fixed to the shaft 33' so as to rotate therewith. The shaft 34' is mounted in the same manner as the shaft 34 in the previously described form of the invention, but has a sprocket 161 fixed thereon to rotate therewith. A sprocket chain 172 operates over the sprockets 170 and 171, and it will thus be obvious that the shafts 33' and 34' are rotated in the same direction at the same rate. The rollers 51 and 52 are the same in construction and are driven in the same manner through the same gearing mounted on the sector gear 35 as in the form of the invention shown in Figs. 1 to 6 inclusive, being driven from the gear 24 on the conveyor roller 12 through the gear 25. The shaft 34' is thus driven from the gear 24 through the gear 25 and the shaft 33', sprockets 170, 171 and sprocket chain 172 in the same direction and at the same speed as the gear 39.

The sector gear 36' is the same in construction as the sector gear 36 shown in Figs. 1 to 6 and meshes with the gear 35 in the same manner to move the rollers carried thereby in the same manner as previously described, but instead of having shafts for the rollers mounted for independent free rotation in suitable bearings therein the shaft 34' is provided with a spur gear 173, which rotates with the shaft 34' and meshes with a gear 174, which is mounted on a suitable stub shaft 175 on the sector gear 36', said gear 174 in turn meshing with a gear 176 fixed on the shaft 54', which is provided with a roller 56', which is of the same construction as the roller 56 provided on the shaft 54, in the form shown in Figs. 1 to 6 inclusive. Similarly the shaft 34' is provided with a roller 57' which corresponds in construction to the roller 57 shown in Figs. 1 to 6, inclusive. The gear 176 meshes with the gear 177 which is mounted on a stub shaft 178 mounted on the sector gear 36', and said gear 177 meshes with the gear 179 fixed on the shaft 53', which is provided with a roller 55' corresponding in construction to the roller 55 provided on the shaft 53 in the form shown in Figs. 1 to 6. It will be obvious that the gears 176 and 179 will be rotated in the same direction as the gear 173 and thus the rollers 55', 56' and 57' will be rotated in the same direction and at the same rate as the rollers 50, 51 and 52.

The operation of the panning device shown in Figs. 7 to 9 inclusive, is exactly the same as that previously described, except for the fact that the rollers 55', 56' and 57' are positively driven through the sprocket and gear drive above described. Accordingly rotation of the set of rollers most remote from the conveyor belt 13 is not produced by the advance of said molded loaf under the action of the positively driven rollers 50, 51 and 52, but instead the rollers 55', 56' and 57', if engaged by said loaf, before the dumping of the loaf by the mechanism takes place because of engagement of the loaf with the vane 68, positively move the loaf in a direction away from the discharge end of the conveyor belt 13 until the rollers swing downwardly and discharge the loaf into the pan as previously described.

What I claim is:

1. In a loaf panning device, a pan conveyor, a pan stop associated therewith, loaf supporting means comprising a plurality of rollers, means for mounting said rollers for rotation about parallel axes, a loaf conveyor discharging onto said loaf supporting means at one end thereof, loaf actuated means for moving said mounting means between a loaf supporting position with said rollers in substantially horizontal alignment and a dumping position, comprising a controlling member, means for mounting said controlling member over said loaf supporting means for adjustment of said controlling member toward and away from the discharge end of said loaf conveyor, and means actuated by movement of said mounting means into dumping position for moving said pan stop out of holding position.

2. The combination with a pan conveyor and a loaf conveyor, of means for delivering a loaf from said loaf conveyor to a pan on said pan conveyor comprising horizontally disposed conveying means receiving said loaves from said loaf conveyor and mounted over said pan conveyor, a movable mounting for said conveying means, and means for moving said mounting to move said conveying means from a horizontal loaf supporting position to a position to discharge a loaf therefrom into a pan on said pan conveyor and return said conveying means to loaf supporting position, comprising a controlling member mounted over said horizontally disposed conveying means in the path of said loaves advanced thereby and a return movement controlling member engaged by said movable mounting for said conveying means upon movement thereof to discharge position to actuate said return movement controlling member.

3. The combination with a pan conveyor and a loaf conveyor, of means for delivering a loaf from said loaf conveyor to a pan on said pan conveyor comprising conveying means receiving said loaves from said loaf conveyor and mounted over said pan conveyor, a movable mounting for said conveying means, means for moving said mounting to move said conveying means between a loaf supporting position and a position to discharge a loaf therefrom into a pan on said pan conveyor, and means controlling movement of said mounting including an actuating member mounted over said conveying means in a position for engagement by a loaf reaching a predetermined position on said conveying means to move said mounting out of loaf supporting position and a return movement actuating member engaged by said mounting during movement of said mounting into discharge position to return said mounting to loaf supporting position.

4. In a loaf panning device, loaf supporting means comprising a plurality of rollers, means for mounting said rollers for rotation about parallel axes, loaf actuated means for moving said mounting means into a position to discharge a loaf from said conveying means and mounting means actuated means for returning said mounting means from discharge position to a position in which said conveying means is in loaf supporting position.

5. In a loaf panning device, loaf supporting means comprising a plurality of rollers, means for mounting said rollers for rotation about parallel axes and means for swinging said mounting means about a pair of spaced axes between a loaf supporting position with a plurality of said rollers in substantially horizontal alignment between said pair of axes and a dumping position, each of said rollers having a metallic core and a rigid synthetic resin surface covering extending continuously around said core.

6. In a loaf panning device, loaf supporting means comprising a plurality of rollers, means for mounting said rollers for rotation about parallel axes and means for swinging said mounting means about a pair of spaced axes between a loaf supporting position with a plurality of said rollers in substantially horizontal alignment between said pair of axes and a dumping position, each of said rollers having a metallic core and a rigid synthetic resin surface covering having a roughened outer surface extending continuously around said core.

7. In a loaf panning device, a loaf supporting means comprising a plurality of rollers, means for mounting said rollers for rotation about parallel axes and means for swinging said mounting means about a pair of spaced axes between a loaf supporting position with a plurality of said rollers in substantially horizontal alignment between said pair of axes and a dumping position, each of said rollers having a metallic core and an outer sleeve of polytetrafluoroethylene surrounding said core.

8. The combination with a loaf conveyor, of loaf supporting means at the discharge end of said loaf conveyor, said loaf supporting means comprising a plurality of rollers, means for mounting said rollers for rotation about parallel axes extending transversely of said loaf conveyor, said mounting comprising a pair of members mounted for swinging movement between a position with all said rollers in a substantially horizontally aligned supporting position at a lower level than the discharge end of said loaf conveyor and a dumping position, one of said members being mounted to swing about a horizontal axis co-incident with the axis of one of said rollers and adjacent but spaced beyond the discharge end of said loaf conveyor and the other of said members being mounted to swing about a horizontal axis remote from said discharge end of said loaf conveyor.

9. In a loaf panning device, loaf supporting means comprising a plurality of rollers, means for mounting said rollers for rotation about parallel axes, said mounting means including a pair of sector members mounted for rotation about a pair of parallel spaced axes and having intermeshing teeth on the peripheries thereof, each of said sector members having a plurality of said rollers mounted thereon, means for rotating a plurality of said rollers in the same direction and means for swinging said mounting means about said pair of axes between a loaf supporting position with the axes of all said rollers in horizontal alignment and a dumping position with said rollers in spaced rows descending from each of said axes, comprising power means for swinging one of said sector members about its axis through a predetermined arc.

10. In a loaf panning device, loaf supporting means comprising a plurality of rollers, means for mounting said rollers for rotation about parallel axes, said mounting means including a pair of sector members mounted for rotation about a pair of parallel spaced axes and having intermeshing teeth on the peripheries thereof, each of said sector members having a plurality of said rollers mounted thereon, means for rotating a plurality of said rollers in the same direction and means for swinging said mounting means about said pair of axes between a loaf supporting position with the axes of all said rollers in horizontal alignment and a dumping position with said rollers in spaced rows descending from each of said axes, comprising power means for swinging one of said sector members about its axis through a predetermined arc, said rollers mounted on each of said sectors comprising an end roller mounted co-axially with the axis about which said sector rotates, and said means for rotating the rollers on a sector in the same direction comprising a gear mounted to rotate with each of said rollers, idler gears mounted for rotation on said sector and each meshing with the gears that rotate with a pair of adjacent rollers, and means for driving the gear mounted to rotate with said end rollers.

11. In a loaf panning device, a pan conveyor, a pan stop associated therewith, loaf supporting means comprising a plurality of rollers, means for mounting said rollers for rotation about parallel axes, means for moving said mounting means between a loaf supporting position with said rollers in substantially horizontal alignment and a dumping position, and means actuated by movement of said mounting means into dumping position for moving said pan stop out of holding position and for returning said loaf supporting means to loaf supporting position, comprising controlling means initiating return movement of said loaf supporting means prior to movement of said pan stop out of holding position.

12. In a loaf panning device, a loaf conveyor, loaf supporting means positioned beyond the discharge end of said loaf conveyor to receive molded loaves discharged from said conveyor, said loaf supporting means comprising conveying means and a mounting for said conveying means movable between a position in which said conveying means is in loaf supporting position and a position in which said conveying means is in loaf dumping position, means controlling movement of said mounting from said supporting to said dumping position comprising an actuating member mounted for engagement by a loaf on said conveying means upon reaching a predetermined position on said conveying means, a pan stop, means actuated by movement of said mounting means into dumping position for moving said pan stop out of holding position and means for adjusting the relative positions of said actuating member and said pan stop.

13. In a loaf panning device, a loaf conveyor, loaf supporting means positioned beyond the discharge end of said loaf conveyor to receive molded loaves discharged from said conveyor, said loaf supporting means comprising conveying means and a mounting for said conveying means movable between a position in which said conveying means is in loaf supporting position and a position in which said conveying means is in loaf dumping position, means controlling movement of said mounting from said supporting to said dumping position comprising an actuating member mounted for engagement by a loaf on said conveying means upon reaching a predetermined position on said conveying means, a pan stop, means actuated by movement of said mounting means into dumping position for moving said pan stop out of holding position, means for adjusting the spacing of said actuating member from the discharge end of said loaf conveyor and independent means for adjusting the position of said pan stop longitudinally of said pan conveyor.

14. The combination with a loaf conveyor having a roller at its discharge end and a belt extending around said roller of loaf dumping means located endwise beyond the discharge end of said loaf conveyor comprising a row of closely spaced parallel rollers of less than half the diameter of said conveyor roller, a mounting for said rollers swingable about an axis co-incident with the axis of the end roller of said row adjacent said conveyor roller, said axis being parallel to and spaced laterally from the axis of said loaf conveyor roller, and means for swinging said row of rollers between a position in which the same are horizontally aligned in loaf supporting position and a position in which said row of rollers is in a descending loaf dumping position with respect to said axis.

15. The combination with a loaf conveyor having a roller at its discharge end and a belt extending around said roller of loaf dumping means located endwise beyond the discharge end of said loaf conveyor comprising a row of closely spaced parallel rollers, said conveyor roller having a greater diameter than said parallel rollers, a mounting for said rollers swingable about an axis coincident with the axis of the end roller of said row adjacent said conveyor roller, said axis being parallel to and spaced endwise beyond and above the axis of said loaf conveyor roller and closely adjacent said belt, and means for swinging said row of rollers between a position in which the same are horizontally aligned in loaf supporting position and a position in which said row of rollers is in a descending loaf dumping position with respect to said axis.

16. The combination with a loaf conveyor having a roller at its discharge end and a belt extending around said roller of loaf dumping means located endwise beyond the discharge end of said loaf conveyor comprising two sets of closely spaced parallel rollers of much smaller diameter than said conveyor roller, each set comprising a row of rollers consisting of end and intermediate rollers, a mounting for each row of rollers swingable about axes co-incident with an end roller of each row, one of said axes being parallel to, spaced endwise beyond and above the axis of said loaf conveyor roller and closely adjacent said belt, said loaf dumping means being movable between a loaf supporting position and a dumping position, means controlling movement of said loaf dumping means from said supporting to said dumping position comprising an actuating member mounted for engagement by a loaf on said dumping means in loaf supporting position upon reaching a predetermined position thereon, a pan stop, means actuated by movement of said dumping means into dumping position for moving said pan stop out of holding position, means for adjusting the spacing of said actuating member from the discharge end of said loaf conveyor and independent means for adjusting the position of said pan stop longitudinally of said pan conveyor.

17. The combination with a loaf conveyor having a roller at its discharge end and a belt extending around said roller of loaf dumping means located endwise beyond the discharge end of said loaf conveyor comprising a row of closely spaced parallel rollers of less than half the diameter of said conveyor roller, a mounting for said rollers swingable about an axis co-incident with the axis of the end roller of said row adjacent said conveyor roller, said axis being parallel to and spaced laterally from the axis of said loaf conveyor roller, and means for swinging said row of rollers between a position in which the same are horizontally aligned in loaf supporting position at a lower level than the upper run of said belt and a position in which said row of rollers is in a descending loaf dumping position with respect to said axis.

References Cited in the file of this patent

UNITED STATES PATENTS

| | | |
|---|---|---|
| 240,715 | Holmes | Apr. 26, 1881 |
| 1,114,138 | Hitchner | Oct. 20, 1914 |
| 1,357,476 | Rogers | Nov. 2, 1920 |
| 2,206,279 | Ferguson | July 2, 1940 |
| 2,349,423 | Harber | May 23, 1944 |
| 2,394,795 | Manspeaker | Feb. 12, 1946 |
| 2,438,811 | Le Sage | Mar. 30, 1948 |
| 2,540,945 | Hart | Feb. 6, 1951 |
| 2,590,823 | Rhodes | Mar. 25, 1952 |
| 2,612,983 | Alden | Oct. 7, 1952 |
| 2,681,171 | Brown et al. | June 15, 1954 |
| 2,843,062 | Kieffaber | July 15, 1958 |
| 2,893,534 | Sexauer | July 7, 1959 |